US012747735B2

(12) United States Patent
Miller et al.

(10) Patent No.: US 12,747,735 B2
(45) **Date of Patent: *Sep. 29, 2026**

(54) GAS TURBINE ENGINE WITH ACOUSTIC SPACING OF THE FAN BLADES AND OUTLET GUIDE VANES

(71) Applicant: General Electric Company, Evendale, OH (US)

(72) Inventors: Brandon Wayne Miller, Evendale, OH (US); Egbert Geertsema, Evendale, OH (US); Arthur W. Sibbach, Boxford, MA (US); Andrew Hudecki, Evendale, OH (US); Timothy Richard DePuy, Evendale, OH (US); John C. Schilling, Evendale, OH (US); Frank Worthoff, Evendale, OH (US); Tsuguji Nakano, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/177,424

(22) Filed: Apr. 11, 2025

(65) Prior Publication Data

US 2026/0153097 A1 Jun. 4, 2026

Related U.S. Application Data

(63) Continuation-in-part of application No. 18/744,069, filed on Jun. 14, 2024, now Pat. No. 12,292,017.

(51) Int. Cl.
*F04D 29/32* (2006.01)
*F01D 9/04* (2006.01)
(Continued)

(52) U.S. Cl.
CPC ............. *F04D 29/324* (2013.01); *F01D 9/04* (2013.01); *F02K 3/06* (2013.01); *F04D 19/002* (2013.01);
(Continued)

(58) Field of Classification Search
CPC .... F02K 3/06; F02C 7/045; F02C 7/24; F04D 29/666; F05D 2220/36; F05D 2240/12; F05D 2260/96; F05D 2300/603
See application file for complete search history.

(56) References Cited

U.S. PATENT DOCUMENTS 3,505,819 A 4/1970 Wilde
3,534,556 A 10/1970 Wilde
(Continued)

FOREIGN PATENT DOCUMENTS

EP 3 085 897 B1 9/2021

OTHER PUBLICATIONS

Gliebe et al., *Ultra-High Bypass Engine Aeroacoustic Study*, No. NASA/CR-2003-212525, 2003.

*Primary Examiner* — Brian Christopher Delrue
(74) *Attorney, Agent, or Firm* — Sparkman, LLP

(57) ABSTRACT

A gas turbine engine comprises a fan, a core turbine engine coupled to the fan, a fan case housing the fan and the core turbine engine, a plurality of outlet guide vanes extending between the core turbine engine and the fan case, and an acoustic spacing. The fan comprises a plurality of fan blades that define a fan diameter and a BEAL. The fan case comprises an inlet and an inlet length between the inlet and the fan. The acoustic spacing comprises a distance between the fan and the plurality of outlet guide vanes, and in combination with the BEAL determines an acoustic spacing ratio of the gas turbine engine.

20 Claims, 4 Drawing Sheets

(51) Int. Cl.
*F02K 3/06* (2006.01)
*F04D 19/00* (2006.01)

(52) U.S. Cl.
CPC ...... *F05D 2200/12* (2013.01); *F05D 2200/13* (2013.01); *F05D 2200/14* (2013.01); *F05D 2200/221* (2013.01); *F05D 2200/262* (2013.01); *F05D 2220/323* (2013.01); *F05D 2220/36* (2013.01); *F05D 2240/12* (2013.01); *F05D 2240/30* (2013.01); *F05D 2260/96* (2013.01)

(56) References Cited

U.S. PATENT DOCUMENTS 5,169,288 A 12/1992 Gliebe et al.
5,255,510 A * 10/1993 Lardellier ............... F02K 3/075 60/226.3
5,299,914 A * 4/1994 Schilling ................. F01D 5/141 416/223 A
6,195,983 B1 3/2001 Wadia et al.
7,118,331 B2 10/2006 Shahpar
7,374,403 B2 5/2008 Decker et al.
7,374,404 B2 5/2008 Schilling et al.
9,540,938 B2 1/2017 Topol et al.
9,920,653 B2 3/2018 Lord et al.
10,107,191 B2 10/2018 Gilson et al.
10,247,018 B2 4/2019 Topol et al.
10,458,426 B2 10/2019 Wilkin, II
10,584,632 B1 3/2020 Kannangara et al.
10,677,264 B2 * 6/2020 Moniz ................... F04D 29/324
10,711,797 B2 7/2020 Kroger et al.
10,815,886 B2 10/2020 Kroger et al.
11,199,196 B2 12/2021 Breen
11,377,958 B2 7/2022 Lemarchand et al.
12,012,898 B2 * 6/2024 Miller ....................... F02K 3/06
12,292,017 B1 * 5/2025 Miller ....................... F02K 3/06
2006/0228206 A1 * 10/2006 Decker ................... F01D 5/141 415/1
2008/0283676 A1 11/2008 Jain et al.
2009/0082976 A1 3/2009 Anuzis et al.
2015/0044028 A1 2/2015 Lord et al.
2016/0363137 A1 12/2016 Topol et al.
2017/0022820 A1 1/2017 Joseph et al.
2017/0122215 A1 * 5/2017 Houston ................... F02C 7/36
2017/0184053 A1 6/2017 Harvey et al.
2017/0298954 A1 * 10/2017 Qiu ....................... F04D 29/547
2017/0314562 A1 11/2017 Rose
2018/0030926 A1 2/2018 Eckett et al.
2018/0106274 A1 4/2018 Moniz et al.
2019/0128123 A1 5/2019 Paruchuri et al.
2019/0376529 A1 12/2019 Joseph et al.
2020/0347785 A1 11/2020 Morin et al.
2020/0400069 A1 12/2020 Aguilera et al.
2022/0042461 A1 * 2/2022 Molesini ................... F02C 7/36
2022/0049621 A1 2/2022 Sawyers-Abbott et al.
2022/0049656 A1 2/2022 Sawyers-Abbott et al.
2023/0151777 A1 5/2023 Bifulco et al.
2023/0280035 A1 * 9/2023 Depperschmidt ......... F23R 3/50 60/39.76
2024/0151185 A1 * 5/2024 Miller ....................... F02K 3/06
2024/0318614 A1 * 9/2024 Mondal ..................... F02K 3/06

* cited by examiner

| Engine | *As* (320) | *c* (210) chord length | *rr* radius ratio | *S* span | *Nb* | *Nv/ Nb* | γ stagger angle | BEAL | ASR | FBD |
|---|---|---|---|---|---|---|---|---|---|---|
| #1 | 20.0 | 27 | 0.350 | 25.0 | 16 | 2.6 | 33 | 4.70 | 1.62 | 76.9 (#1) |
| #2 | 3.0 | 10 | 0.350 | 24.0 | 20 | 3.0 | 30 | 0.56 | 1.80 | 73.8 (#1) |
| #3 | 9.0 | 26 | 0.300 | 30.0 | 24 | 2.1 | 31 | 2.30 | 1.88 | 85.7 (#2) |
| #4 | 11.0 | 20 | 0.250 | 26.0 | 22 | 3.0 | 35 | 1.53 | 2.40 | 69.3 (#1) |
| #5 | 2.0 | 8 | 0.200 | 28.0 | 22 | 3.0 | 30 | 0.22 | 2.96 | 70.0 (#1) |
| #6 | 6.0 | 16 | 0.250 | 30.0 | 20 | 2.5 | 45 | 0.80 | 2.98 | 80.0 (#2) |
| #7 | 10.0 | 31 | 0.300 | 28.0 | 26 | 2.0 | 34 | 3.13 | 1.60 | 80.0(#2) |
| #8 | 20.0 | 20 | 0.330 | 30.0 | 14 | 2.9 | 30 | 2.46 | 2.84 | 89.6 (#2) |
| #9 | 10.0 | 18 | 0.340 | 32.0 | 22 | 3.0 | 31 | 1.20 | 2.79 | 97.0 (#3) |
| #10 | 10.0 | 20 | 0.330 | 35.0 | 16 | 2.8 | 55 | 1.22 | 2.91 | 104.5 (#3) |
| #11 | 21.0 | 29 | 0.210 | 38.0 | 16 | 2.5 | 31 | 3.00 | 2.80 | 96.2 (#3) |
| #12 | 18.0 | 35 | 0.290 | 40.0 | 20 | 3.0 | 36 | 3.49 | 1.72 | 112.7 (#3) |
| #13 | 13.1 | 12.8 | 0.275 | 31.9 | 22 | 2.2 | 43.0 | 0.47 | 12.75 | 88.0 (#2) |
| #14 | 13.9 | 12.8 | 0.275 | 31.9 | 22 | 2.2 | 43.0 | 0.47 | 13.53 | 88.0 (#2) |
| #15 | 19.5 | 13.5 | 0.210 | 28.0 | 14 | 2.9 | 55.0 | 0.68 | 10.11 | 80.0 (#2) |
| #16 | 16.5 | 18.5 | 0.270 | 37.2 | 16 | 2.3 | 53.0 | 0.95 | 7.73 | 101.9 (#3) |
| #17 | 16.5 | 18.5 | 0.270 | 32.0 | 16 | 2.3 | 53.0 | 1.10 | 6.65 | 87.7 (#2) |
| #18 | 14.5 | 12.8 | 0.280 | 31.4 | 20 | 3.0 | 43.0 | 0.53 | 9.12 | 87.2 (#2) |
| #19 | 10.3 | 12.8 | 0.275 | 28.0 | 22 | 2.2 | 43.0 | 0.54 | 8.80 | 77.2 (#1) |
| #20 | 5.5 | 14.0 | 0.275 | 29.0 | 22 | 2.2 | 43.0 | 0.62 | 4.07 | 80.0 (#2) |
| #21 | 3.8 | 11.0 | 0.275 | 33.0 | 22 | 2.2 | 43.0 | 0.34 | 5.18 | 91.0 (#2) |
| #22 | 14.0 | 12.0 | 0.275 | 32.0 | 22 | 2.2 | 43.0 | 0.41 | 15.55 | 88.3 (#2) |

FIG. 4

GAS TURBINE ENGINE WITH ACOUSTIC SPACING OF THE FAN BLADES AND OUTLET GUIDE VANES

CROSS-REFERENCE TO RELATED APPLICATIONS

This application is a continuation-in-part of U.S. application Ser. No. 18/744,069, filed Jun. 14, 2024. The prior application is incorporated herein by reference in its entirety.

FIELD

This application generally relates to gas turbine engines for aircraft and, more particularly, to geared gas turbine engines with an acoustic spacing and other noise-reducing architecture.

BACKGROUND

A gas turbine engine for an aircraft typically includes a fan, a compressor, a combustion section, a turbine section, and a nozzle section. The fan propels air entering the gas turbine engine into the compressor. The compressor increases the pressure of the air as the air is routed into the combustion section. The combustion section combusts the pressurized air with fuel to produce combustion gases. The combustion gases are routed through the turbine section and exit the gas turbine engine via the nozzle section, thereby producing thrust.

BRIEF DESCRIPTION OF THE DRAWINGS

FIG. 4 shows exemplary acoustic spacing ratios for exemplary gas turbine engines.

DETAILED DESCRIPTION

Figure 1:
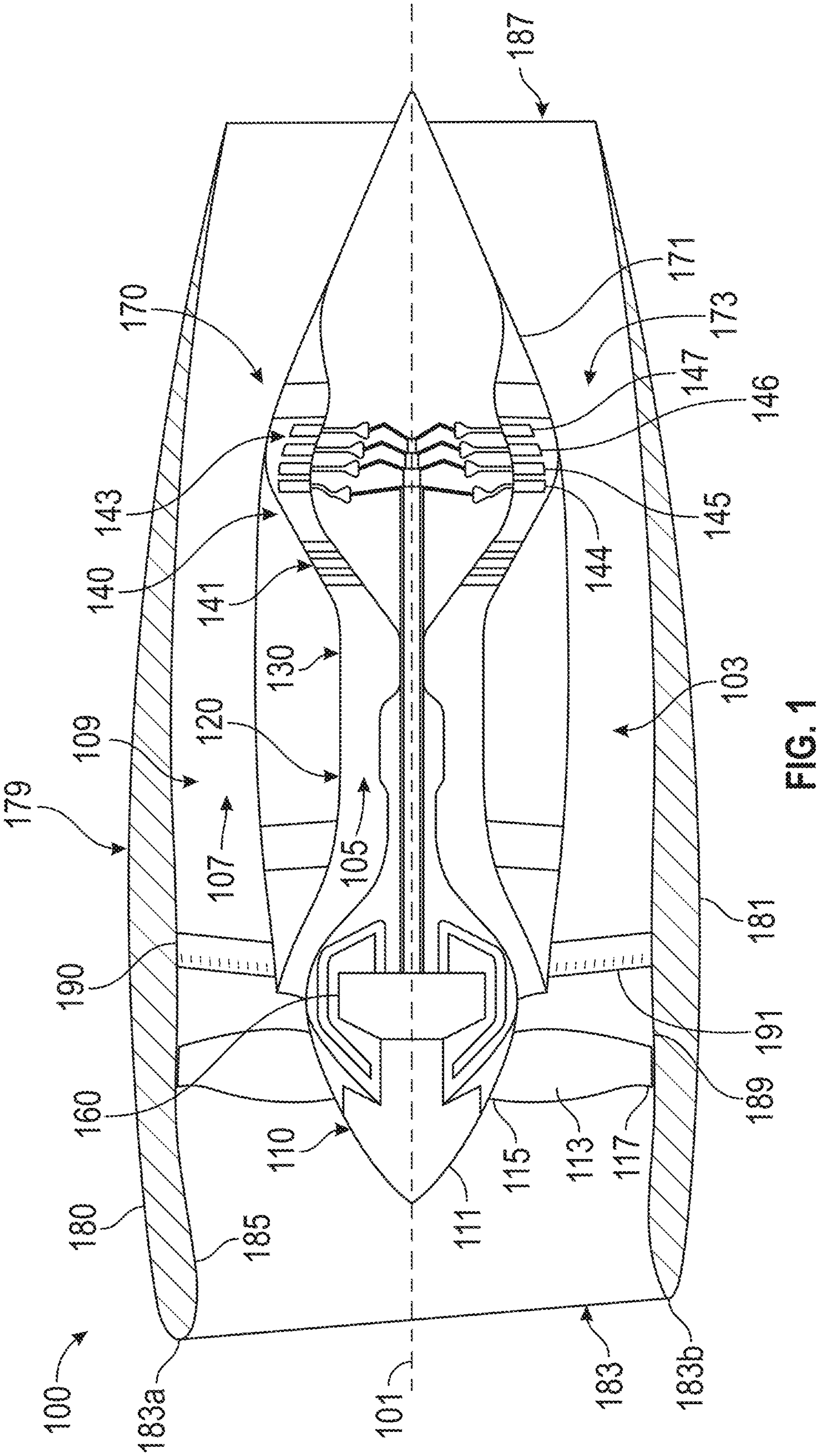
FIG. 1 shows a schematic view of an exemplary gas turbine engine, according to one example.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features and characteristics described in conjunction with a particular aspect, embodiment or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are relatively discernable by one of ordinary skill in the art.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/of" used between the last two of a list of elements means any one or more of the listed elements. For example, the phrase "A, B, and/or C" means "A," "B," "C," "A and B," "A and C," "B and C" or "A, B and C." As used herein, the term "coupled" generally means physically, chemically, electrically, magnetically, or otherwise coupled or linked and does not exclude the presence of intermediate elements between the coupled items absent specific contrary language.

As used herein in this application and in the claims, the terms "forward" and "fore" refer to an upstream direction oriented towards an inlet of the gas turbine engine.

As used herein in this application and in the claims, the terms "aft" or "behind" refer to a downstream direction oriented towards an outlet of the gas turbine engine.

As used herein in this application and in the claims, the term "axial" refers to a dimension extending along a central longitudinal axis of the gas turbine engine from a forward portion of the gas turbine engine to an aft portion of the gas turbine engine.

As used herein in this application and in the claims, the term "radial" refers to a dimension extending radially outwards from the central longitudinal axis.

As used herein in this application and in the claims, the term "OGV" refers to an outlet guide vane of the gas turbine engine.

Gas turbine engines generate significant noise during operation and it is desirable to reduce the amount of noise generated. The degree of noise generated is a function of, among other things, the relative positioning of components of the engine. Modifications to the engine's architecture, such as the relative position of a vane downstream of a rotating part and the airfoil characteristics of the vane, can have a significant impact on the noise generated. However, changes made to reduce noise can also negatively impact performance in terms of weight, drag, etc. One cannot simply change relative positions or airfoil characteristics without imposing significant penalties on the engine drag, weight, etc. Thus, there are difficult trade-offs to be made between, on the one hand, reducing the noise envelope to satisfy more stringent community noise requirements and, on the other hand, not negating performance improvements (weight, drag, specific fuel consumption, etc.) for the sake of reducing the noise generated at take-off. Conventional methods of reducing gas turbine engine noise, such as varying fan pressure ratio ("FPR"), can be insufficient to meet increasingly stringent community noise requirements.

The inventors of the present disclosure have found that a quieter gas turbine engine can be achieved by providing a specific range of acoustic spacing between the fan blades and OGVs in combination with specific ranges of certain other features of the engine architecture. Such a configuration of the fan blades and OGVs may maintain a desired overall propulsive efficiency for the turbofan engine while desirably reducing the noise generated by the engine. As part of the process of determining this acoustic spacing, the inventors discovered that a relationship between a ratio of the acoustic spacing and a blade effective acoustic length, which is determined based on particular features of fan (e.g., chord length, span, stagger angle, radius ratio, number of blades), can provide desirable improvements in noise reductions for the gas turbine engine.

FIG. 1 is a schematic cross-section view of a gas turbine engine 100 configured to produce thrust or power for an aircraft. In some examples, the gas turbine engine 100 can be an aircraft engine configured to produce at least 17,500 horsepower of thrust. In other examples, the gas turbine engine 100 can be an aircraft engine configured to produce between 1 and 17,500 horsepower of thrust.

The gas turbine engine 100 defines a central longitudinal axis 101 extending between a forward portion and a rear portion of the gas turbine engine 100. The gas turbine engine 100 includes a core turbine engine 103 centered about the central longitudinal axis 101, a fan 110 disposed forward of the core turbine engine 103, a nacelle 179 which includes a fan case 180 encasing or housing the fan 110, and outlet guide vanes ("OGVs") 190 disposed aft of the fan 110 and extending radially between the core turbine engine 103 and the fan case 180. FIG. 1 illustrates a fan case 180 generally extending to the aft end of the gas turbine engine; however, in other examples, the length and/or relative position of the fan case to the gas turbine engine (forward and/or aft) may vary.

The fan 110 is configured to propel air through the gas turbine engine 100. During the operation of the gas turbine engine 100, the fan 110 draws a first portion of the air 105 into the core turbine engine 103. The fan 110 draws a second portion of the air 107 into a bypass stream 109 disposed outside the core turbine engine 103. The fan 110 comprises a fan disk 111 and a plurality of fan blades 113 that radially extend from the fan disk 111. However, other examples of the fan 110 can comprise additional or alternative components.

The fan disk 111 is centered about and is configured to rotate about the central longitudinal axis 101. The fan disk 111 comprises a front hub that can be aerodynamically contoured to promote airflow through the fan 110.

The plurality of fan blades 113 are coupled to and uniformly spaced around the circumference of the fan disk 111. Each of the plurality of fan blades 113 comprises a fan blade root 115, at which the fan blade 113 is coupled to the fan disk 111, and a fan blade tip 117 disposed opposite the fan blade root 115. The fan blade root 115 is oriented radially inwards towards the central longitudinal axis 101, while the fan blade tip 117 is oriented radially outward away from the central longitudinal axis 101. The distance between the fan blade root 115 and the fan blade tip 117 defines a span or a length of the fan blade 113.

In some examples, the number ($N_b$) of fan blades 113 can desirably be between 14 and 26 fan blades. In other examples, the plurality of fan blades 113 can number between 20 and 24 fan blades, 20 and 22 fan blades, or 22 fan blades.

Characteristics of the fan 110 include the fan pressure ratio ("FPR"). FPR is defined as the ratio of the pressure of the air entering fan 110 from an upstream direction to the pressure of the air exiting the fan 110 in a downstream direction. In some examples, the FPR of the gas turbine engine 100 can be greater than or equal to 1.25 and less than or equal to 1.45. In other examples, the FPR can be greater than 1.30 or 1.35, and less than 1.40.

During operation, the core turbine engine 103 generates mechanical energy for rotating the fan 110. The core turbine engine 103, disposed aft of the fan 110, includes a compressor section 120, a combustion section 130, a turbine section 140, a drive shaft system 150, a gearbox assembly 160, and a nozzle section 170. However, other examples of the gas turbine engine 100 can comprise additional or alternative components.

During operation, the compressor section 120 compresses or increases the pressure of the air 105 propelled into the core turbine engine 103 by the fan 110. The compressor section 120 is typically the forward-most component of the core turbine engine 103 and thus can be disposed directly aft of the fan 110. In some examples, the compressor section 120 comprises one or more stages of a low-pressure compressor and one or more stages of a high-pressure compressor.

The combustion section 130, which is disposed aft of the compressor section 120, combusts the air pressurized by the compressor section 120 with fuel to produce combustion gases.

During operation, the turbine section 140 generates power by extracting thermal and kinetic energy from the combustion gases produced by the combustion section 130. The turbine section 140 produces power in any suitable range sufficient to power the fan 110. The turbine section 140 comprises a high pressure turbine 141 and a low pressure turbine 143. The high pressure turbine 141, disposed aft of the combustion section 130, extracts energy from the combustion gases leaving the combustion section 130. The low pressure turbine 143 is disposed aft of the high pressure turbine 141 and extracts energy from combustion gases leaving the high pressure turbine 141.

In some examples, the low pressure turbine 143 can comprise a plurality of low pressure turbine stages 144, 145, 146, 147. In the illustrated example, the low pressure turbine 143 can be a four-stage low pressure turbine comprising, from fore to aft, a first low pressure turbine stage 144, a second low pressure turbine stage 145, a third low pressure turbine stage 146, and a fourth low pressure turbine stage 147. In some examples, the low pressure turbine comprises three or more stages, such as three stages, four stages, or five stages. Including additional low pressure turbine stages can desirably increase the amount of work extracted from the combustion gases and in some examples, the low pressure turbine comprises four or more stages, such as four stages or five stages.

The drive shaft system 150 can include a high pressure shaft system that couples the high pressure turbine 141 to the compressor section 120 and a low pressure shaft system connecting the low pressure turbine 143 to the fan 110, thereby allowing the turbine section 140 to power the fan 110 and the compressor section 120. In some examples, the drive shaft system 150 can couple the high pressure turbine 141 to the high pressure compressor (not pictured) and can couple the low pressure turbine 143 to the low pressure compressor (not pictured) and the fan 110. In some examples, the drive shaft system 150 can comprise a plurality of concentric shafts configured to rotate about and extending along the central longitudinal axis 101 (also referred to herein as the engine centerline).

The gearbox assembly 160 couples the turbine section 140 to the fan 110. In some examples, the gearbox assembly 160 can be configured to receive power from a plurality of sources. In some examples, the gearbox assembly 160 can be configured to receive power from each of the low pressure turbine stages 144, 145, 146, 147. The gearbox assembly 160 can be configured to drive or output the power to the fan 110, thereby allowing the low pressure turbine 143 and the fan 110 to rotate at their respective optimal rotational speeds without affecting the operation of the other components. In some of these examples, the gearbox assembly 160 can comprise one or more epicyclic gearboxes or any other suitable gear train configured to couple the turbine section 140 to the fan 110.

The gearbox assembly 160 reduces the rotational speed of the output (to the fan) relative to the input (from the low pressure turbine). In some examples, a gear ratio of the gearbox assembly 160 can be 2-4. For example, the gear ratio can be 2-2.9, 3.2-4, or 3.25-3.75. In some examples, a gear ratio of the gearbox assembly can be greater than 4, such as 4.1-6.0 or 4.1-5.0.

Once the combustion gases have exited the turbine section 140, the combustion gases pass through the nozzle section 170 and exit the gas turbine engine 100. In some examples, the nozzle section can comprise two co-annular nozzles: a combustion nozzle 171 and a fan nozzle 173. The combustion nozzle 171 is the centermost co-annular nozzle configured to allow combustion gases to exit the core turbine engine 103. The fan nozzle 173 is the outermost co-annular nozzle configured to allow air to exit the bypass stream 109.

The fan case 180 houses or encloses the fan 110. The fan case 180 comprises a hollow shell 181, an inlet 183, a lip 185, an outlet 187, and an acoustic treatment 189. However, other examples of the fan case 180 can include additional or alternative components.

The hollow shell 181 protects and/or insulates the fan 110. The hollow shell 181 extends along the central longitudinal axis 101 from the inlet 183 to the outlet 187. The hollow shell 181 is sized to encompass the core turbine engine 103 fully (as shown), or partially such that the inlet 183 is disposed forward of the fan 110 and the outlet 187 is disposed aft of the OGVs 190. The hollow shell 181 features a streamlined shape to improve aerodynamic performance. In some examples, the hollow shell 181 can be streamlined or tapered such that the inlet 183 or a forward end portion of the hollow shell 181 has a wider diameter than the outlet 187 or an aft end portion of the hollow shell 181.

During operation, the inlet 183 allows the passage of air into the gas turbine engine 100. The inlet 183 comprises a circular, forward-facing opening in the hollow shell 181 centered about the central longitudinal axis 101. In some examples, the inlet 183 can be angled relative to the central longitudinal axis 101 such that a top portion 183*a* of the inlet 183, i.e., a portion of the inlet 183 at a twelve o'clock position when the gas turbine engine 100 is mounted to an aircraft, extends forward of a bottom portion 183*b* of the inlet 183 at a six o'clock position, as shown.

The inlet 183 and the hollow shell 181 define a lip 185 extending along the circumference of the inlet 183 at the forward-most edge portion of the hollow shell 181. The lip 185 is contoured or curved to improve aerodynamic performance and/or reduce flow separation. For example, the lip 185 can be contoured such that the hollow shell 181 forms an hourglass shape (in cross-section) forward of the fan 110.

During operation, the outlet 187 allows air and combustion gases to exit the fan case 180. The outlet 187 comprises a circular, aft-facing opening in the hollow shell 181. The outlet 187 can be centered about and orthogonal to the central longitudinal axis 101 of the gas turbine engine 100.

The acoustic treatment 189 can be provided to acoustically insulate the fan case 180 during operation, thereby desirably reducing the amount of noise emitted by the gas turbine engine 100. The acoustic treatment 189 can comprise a multi-layered liner disposed on a circumferential interior surface of the hollow shell 181. When disposed on the circumferential interior surface of the hollow shell 181, the multi-layered liner can comprise a radially innermost porous layer, an intermediate partitioned layer, and a radially outermost impervious layer. In some examples, the acoustic treatment 189 is disposed on the portion of the interior surface of the hollow shell 181 extending between the fan 110 and the OGVs 190.

The OGVs 190 couple the fan case 180 to the core turbine engine 103 and steer the air 107 in the bypass stream 109 towards the fan nozzle 173 and the outlet 187. The OGVs 190 extend radially outwards to the circumferential interior surface of the hollow shell 181 of the fan case 180, and can be disposed in a radially uniform fashion around the circumference of the core turbine engine 103. In some examples, the OGVs 190 can be swept such that a tip or a radially outward end portion of each of the OGVs 190 is angled towards the aft end of the gas turbine engine 100.

In some examples, each of the OGVs comprises a serrated leading edge 191. The serrated leading edge 191 can comprise a waveform or a serration extending radially along the edge of each of the OGVs 190. The waves or serrations are configured to reduce the noise generated by the air in the bypass stream 109 passing over the OGVs 190.

The example gas turbine engine 100 depicted in FIG. 1 should not be construed to preclude other suitable configurations of gas turbine engines. It should also be appreciated that aspects of the present disclosure can be incorporated into other suitable gas turbine engines used in aircraft.

Figure 2:
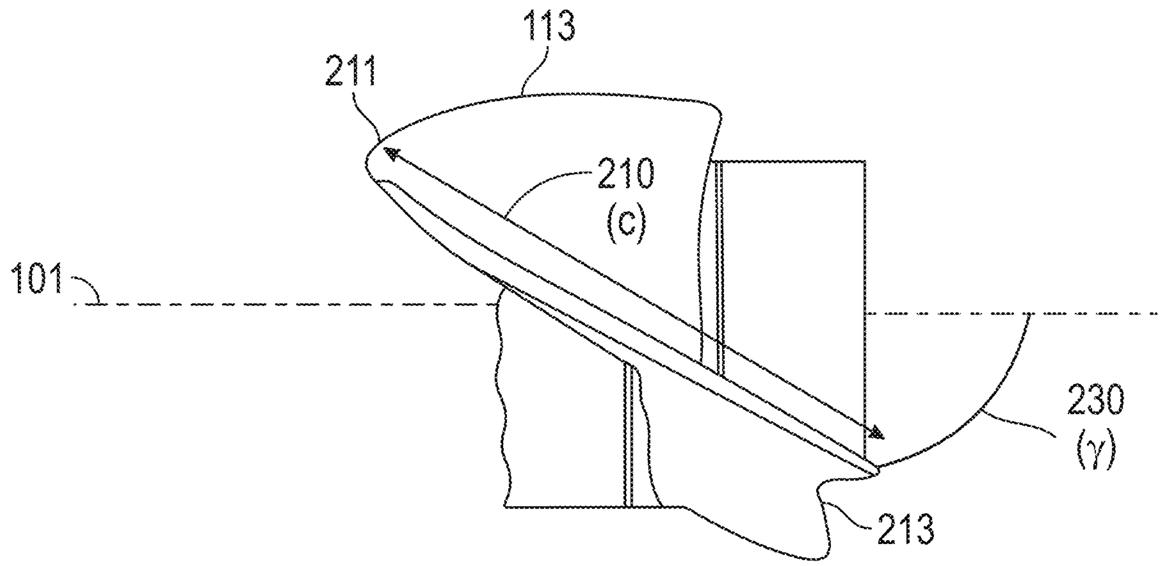
FIG. 2 shows a top view of a fan blade for a gas turbine engine, according to one example.
Figure 3:
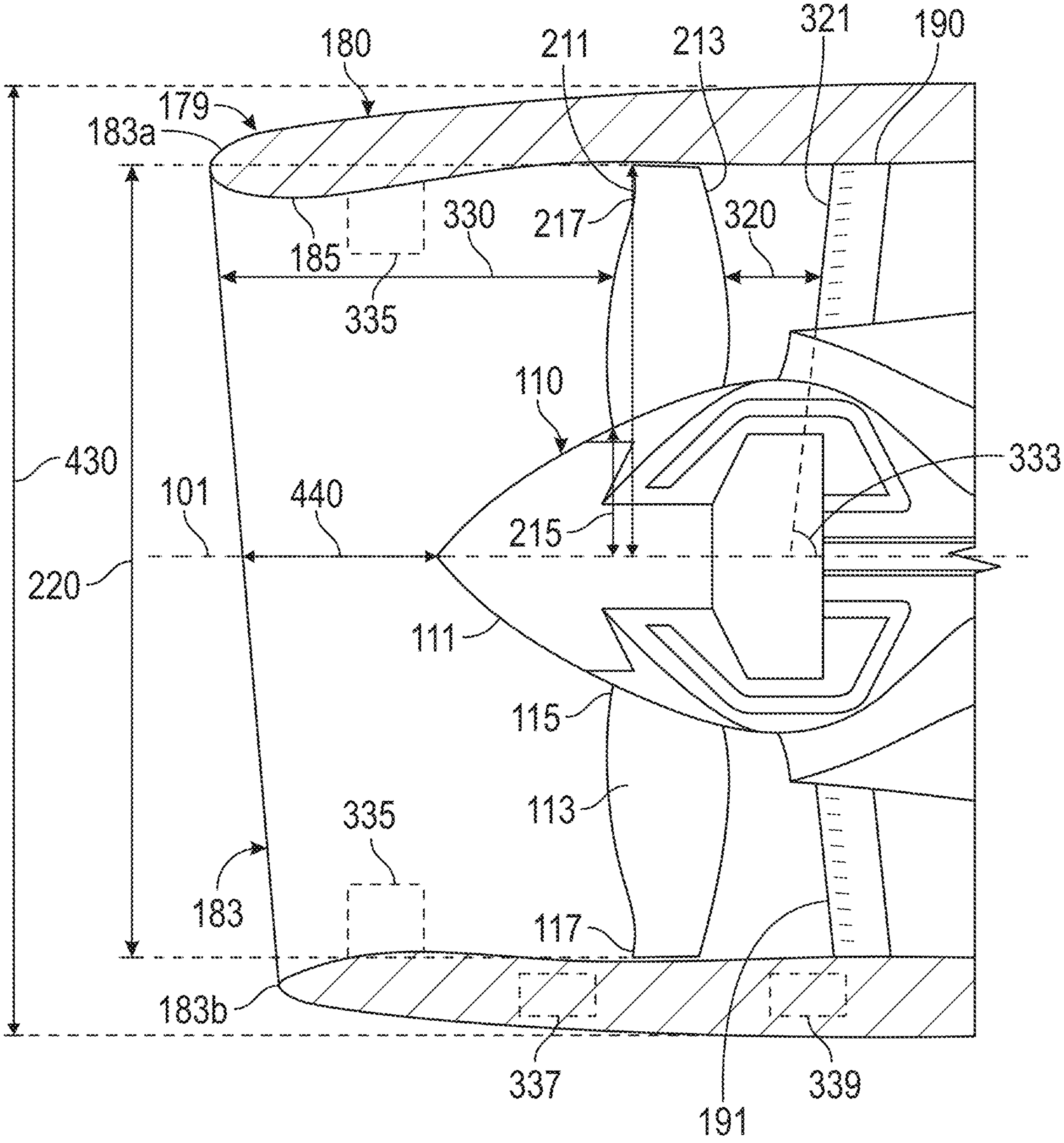
FIG. 3 is a partial view of a gas turbine engine with an acoustic spacing, according to one example.

FIG. 2 shows a top view of a fan blade 113 and FIG. 3 shows a view of the fan 110. Each of the fan blades 113 have a blade solidity (c/s). Each fan blade has a radial span extending from a root at a 0% span position to a tip at a 100% span position. The span S of a blade is the difference in the radius of a leading edge at the tip 217 and the radius of the leading edge of the root at the hub 215.

Blade solidity is defined as the ratio of chord length (c) 210 to the circumferential spacing (s) between the fan blade 113 and a nearest adjacent fan blade 113, measured at a 75% span position of the fan blade 113. As shown in FIG. 2, the chord length 210 is a straight-line distance between a leading edge 211 and a trailing edge 213 of the fan blade. The spacing (s) between adjacent fan blades is calculated by multiplying a fan diameter by 71 and dividing the product by the number ($N_b$) of fan blades. In a first set of examples, enhanced performance can be observed when the blade solidity of the gas turbine engine is greater than or equal to 0.8 and less than or equal to 2. In a second set of examples, enhanced performance can be observed when the blade solidity is greater than or equal to 0.8 and less than or equal to 1.5. In a third set of examples, enhanced performance can be observed when the blade solidity is greater than or equal to 1 and less than or equal to 2. In a fourth set of examples, enhanced performance can be observed when the blade solidity is greater than or equal to 1.25 and less than or equal to 1.75.

In addition, the fan preferably has a low radius ratio (rr), which is a ratio of the radius of the leading edge of the root at the hub 215 to the radius 217 of a blade tip or 100% span position of a blade, both measured from the central longitudinal axis 101 at the leading edge 211 of fan blades as shown in FIG. 3. In some examples, the radius ratio (rr) is 0.2 to 0.35, in other examples, the radius ratio (rr) is 0.25 to 0.3.

Each of the plurality of fan blades 113 defines a stagger angle (γ) 230. The stagger angle 230 is an angle between the central longitudinal axis 101 and a chord line (along which the chord length is measured) as measured at the 75% span position of the respective fan blade. In some examples, the stagger angle 230 can range from 30 degrees to 75 degrees. In other examples, the stagger angle 230 can range from 30 degrees to 60 degrees.

As discussed above, the inventors, during the course of engine design, sought to improve engine performance characteristics including thrust efficiency, installation, engine length from inlet to nozzle, fan case and core size (affecting installed drag) and staying within a maximum weight budget. In one example, the OGVs were mounted to a fan frame, along with the fan and the gearbox assembly. This meant that the OGVs would be located relatively close to the fan so that a more compact engine and efficient (strength/weight) load bearing fan frame could be realized. But the resulting proximity of the fan to the OGVs was found to generate more noise than desired. From an acoustics standpoint, one instead wants to space the fan and the OGVs further apart from each other, generally speaking. But this change can impact the placement of other subsystems and adversely affect overall performance, e.g., gearbox assembly placement and resulting load balances associated with the fan frame, fan frame length, overturning moments, and overall weight of a nacelle, either the fan case type illustrated in FIG. 1 or an engine with a short fan case, such as the engines illustrated in FIGS. 3 and 4, and described in paragraphs [0083]-[0092] of U.S. Patent Application Publication No. 2022/0042461, which have a fan nozzle terminating well upstream of the core nozzle located downstream of the low pressure turbine. As each change impacts other systems, there is a need to understand what combination, or extent of modifications, provide improved acoustic performance without unacceptably negatively impacting other aspects of the engine architecture, as mentioned. Thus, it was exceedingly more challenging to determine how to implement changes without affecting other aspects of the architecture upon which increased performance was dependent upon, than simply making modifications to reduce the noise generated.

Taking these things in mind, the inventors unexpectedly discovered that gas turbine engines, such as the gas turbine engine 100 of FIG. 1, embodying the below-described characteristics have improved acoustic characteristics, but without imposing severe and unacceptable penalties on other aspects of the architecture or engine aero-performance. For example, the inventors found that gas turbine engines with desirable placement of OGVs, such as the OGVs 190 of FIG. 1, may result in the maintaining of or improving upon a desired propulsive efficiency, while improving the turbofan engine's acoustic properties.

FIG. 3 is a schematic, partial cross-sectional view of a gas turbine engine in accordance with the disclosure. For gas turbine engines that have a blade solidity greater than or equal to 0.8 and less than or equal to 2, it has been found that such engines are characterized by a blade effective acoustic length (BEAL) that can be used, as explained below, to determine a range of modifications and/or adjustments that provide improved acoustic performance. The BEAL is determined from (1) below:

$$BEAL = \frac{2c^2}{S(1-rr)N_b}\cos(\gamma) \tag{1}$$

where c is the chord length at 75% span, rr is the radius ratio of the fan, S is the full span of the fan blade (i.e., as measured at a 100% span position at the blade leading edge), γ is the stagger angle, and $N_b$ is the number of fan blades.

Exemplary ranges for the elements of the gas turbine engines described herein are provided below in Table 1. As shown in Table 1, for some variables, the exemplary ranges vary depending on a corresponding range of fan blade diameter. For example, the fan blade diameter (FBD) for three different ranges, FBD #1, FBD #2, and FBD #3 are shown below.

$$65 \le FBD\#1 < 80 \text{ inches}$$

$$80 \le FBD\#2 < 95 \text{ inches}$$

$$95 \le FBD\#3 < 115 \text{ inches}$$

TABLE 1

| Symbol | Description | Exemplary Ranges for Use with BEAL |
|---|---|---|
| c | Chord length at 75% span position (ranges based on FBD) | 5" to 28" (for FBD#1)<br>6" to 33" (for FBD#2)<br>7" to 35" (for FBD#3) |
| S | Span of fan blade at 100% span position (ranges based on FBD) | 24" to 30" (for FBD#1)<br>28" to 36" (for FBD#2)<br>32" to 40" (for FBD#3) |
| rr | Radius ratio (range) | 0.2 to 0.35 |
| Nv | Number of OGVs (ranges) | 1.5 Nb to 3 Nb, 1.8 Nb to 2.4 Nb, 2.0 Nb to 2.5 Nb, or 2.2 Nb to 2.6 Nb |
| γ | Stagger angle (ranges) | 30°-75° or 30°-60° |
| $N_b$ | Number of fan blades (ranges) | 14-26, 20-24, 20-22, or 22 |

As shown in FIG. 3, an acoustic spacing 320 (As) is a length, measured parallel to the central longitudinal axis 101, that extends from the trailing edge 213 of the fan blade 113 to the leading edge 321 of a corresponding one of the OGVs 190. An inlet length 330 is an axial distance between the leading edge 211 of a fan blade 113 and the inlet 183. The acoustic spacing 320, chord length 210 (FIG. 2), and inlet length 330 are measured at the 75% span position of the fan blade 113.

An acoustic spacing ratio (ASR) can be determined using the BEAL, ratio of Nv/Nb, and the acoustic spacing (As) as shown below in (2):

$$ASR = \frac{1}{\left(\frac{Nv}{Nb}\right)} \cdot \frac{As}{BEAL} \tag{2}$$

Nv is the number of vanes of the OGVs. In some examples, the number of OGVs (Nv) are at least twice the number of fan blades (Nb). In some examples, a ratio of the number of OGVs to the number of fan blades (Nv/Nb) is 2.0 to 2.5, or 2.2 to 2.6. In other examples, the ratio of the number of OGVs to the number of fan blades (Nv/Nb) is 1.5 to 3.0 or 1.8 to 2.4.

Varying the acoustic spacing ratio can impact engine performance in the following ways. For example, gas turbine engines with higher acoustic spacing ratios can emit less noise. And gas turbine engines with lower acoustic spacing ratios can reduce the size of the gas turbine engines, thereby beneficially reducing fuel consumption and emissions generated by the gas turbine engines.

Gas turbine engines with the acoustic spacing ratios described herein exhibited the sought-after balance (discussed above) between noise emissions and engine size, thereby featuring enhanced performance over conventional gas turbine engines. For example, enhanced results can be achieved with acoustic spacing ratios from 1.5 to 16, including the lower ratios such as 1.5 to 3.1 or 1.6 to 3, 1.6 to 2.4 or 2.0 to 3, and higher ratios such as 4 to 14 or 6.6 to 13.5, to depending on a desired acoustic spacing and fan blade design.

As shown in FIGS. 1 and 3, the axial extent of the inlet 183 can vary, e.g., between a twelve o'clock position and a six o'clock position. For this type of fan case 180, the inlet length 330 is the average the axial distance between the leading edge 211 of the fan blade 113 and the top portion 183*a* of the inlet 183, and the axial distance between the leading edge 211 the fan blades 113 and the bottom portion 183*b* of the inlet 183, i.e., the inlet length 330 is distance from the leading edge 211 of the fan blade 113 and the inlet 183, as measured at the 75% span position of the fan blade 113.

In one set of examples, the fan diameter 220 ranges from 52 in. to 120 in. In another set of examples, the fan diameter 220 ranges from 75 in. to 105 in. In additional sets of examples, the fan diameter 220 ranges from 70 in. to 80 in, 80 in. to 95 in., or 95 in. to 105 in. An inlet length ratio is the ratio of the inlet length 330 to the fan diameter 220. Enhanced performance of gas turbine engines 100 can be achieved with inlet length ratios from 0.15 to 0.5. Gas turbine engines 100 with inlet length ratios less than or equal to 0.5 can desirably feature enhanced performance compared to conventional gas turbine engines 100 due to reduced fan case length, reduced drag, and reduced fan distortion. In another set of examples, enhanced performance can unexpectedly be achieved with inlet length ratios from 0.15 to 0.4. In further examples, enhanced performance can be achieved with inlet length ratios from 0.15 to 0.3.

In another set of examples, an inlet-to-nacelle (ITN) ratio is defined as a ratio of the inlet length 330 to a nacelle outer diameter 430, which is the largest diameter of the nacelle 179. Enhanced performance of gas turbine engines 100 can be achieved with ITN ratios from 0.18 to 0.45, or in some examples, 0.23 to 0.35. Gas turbine engines 100 with ITN ratios can desirably feature enhanced performance compared to conventional gas turbine engines 100 due to reduced fan case length, reduced drag, and reduced fan distortion. In another set of examples, enhanced performance can unexpectedly be achieved with ITN ratios from 0.27 to 0.35, and from 0.30 to 0.33.

FIG. 3 illustrates an optional part-span inlet guide vane (IGV) 335. A part-span inlet guide vane (IGV) can be provided to direct airflow efficiently through the engine, particularly in the region near the fan. Unlike full-span guide vanes, part-span IGVs extend only partially across the radial span of the airflow path, covering only the inner portion of the span. Part-span IGVs can enhance the aerodynamic efficiency of the engine by optimizing the airflow entering the fan. By guiding the air more precisely, they help reduce turbulence and improve the overall flow characteristics, leading to better engine performance. The presence of part-span IGVs can further contribute to noise reduction. By smoothing the airflow and reducing turbulence, these vanes can help further lower the noise generated by the fan and other downstream components, which is crucial for meeting stringent noise regulations.

Overall, part-span IGVs can be used in combination with the acoustic spacing and related noise reduction features of this disclosure to further reduce noise and enhance the performance and efficiency of the gas turbine engines disclosed herein.

In some examples, a larger ITN can be provided to desirably accommodate a plurality of part-span IGVs. Thus, in such examples, the ITN can have a longer inlet length 330, relative to the fan diameter 220 for use with a high-speed fan. In some examples that a part-span IGV can be used in combination with an ITN of 0.30 to 0.45.

In other examples, as shown in FIG. 3, it can be desirable to provide a larger nacelle to accommodate various thermal system components, such as heat exchangers 337 or deoxygenation systems 339. In such examples, the ITN used in combination with the increased nacelle diameter can be 0.18 to 0.30.

In another set of examples, an inlet-to-fan diameter (ITFD) ratio is defined as a ratio of the inlet length 330 to a fan diameter 220. Enhanced performance of gas turbine engines 100 can be achieved with ITFD ratios from 0.29 to 0.79, or in some examples from 0.40-0.70. Gas turbine engines 100 with ITN ratios can desirably feature enhanced performance compared to conventional gas turbine engines 100 due to reduced fan case length, reduced drag, and reduced fan distortion.

FIG. 3 illustrates a disk spacing length 440, which is the distance between a forwardmost end of the fan disk 111 and the intersection of the inlet taken along the engine centerline (i.e., central longitudinal axis 101). A disk-to-blade diametric (DBD) ratio is the ratio of the disk spacing length 440 to the fan diameter 220. The inventors of the present disclosure have found that enhanced performance of gas turbine engines 100 can be achieved with disk-to-blade diametric ratios that are less than or equal to 0.6, and in some examples with disk-to-blade diametric ratios that range from 0.09 to 0.59, 0.15 to 0.35, and 0.19 to 0.27. Gas turbine engines 100 with disk-to-blade diametric ratios in these ranges can desirably feature enhanced performance compared to conventional gas turbine engines 100 due to reduced drag and reduced fan distortion. Further benefits have been identified when a gas turbine engine is configured to have a DBD ratio in the ranges disclosed above, in combination with an ITN ratio in the ranges disclosed above. For example, a gas turbine engine can have a DBD ratio of 0.22 and an ITN ratio of 0.27, both of which meet at least one of the stated desirable ranges for the DBD and ITN ratios. It should be noted that a gas turbine engine can be configured to meet any combination of the disclosed DBD ratios and the disclosed ITN ratios.

In another set of examples, enhanced performance can unexpectedly be achieved with disk-to-nacelle ratios below 0.47. A disk-to-nacelle diametric (DND) ratio is the ratio of the disk spacing length 440 to the nacelle diameter 430. The inventors of the present disclosure have found that enhanced performance of gas turbine engines 100 can be achieved with disk-to-nacelle diametric ratios that range from 0.07 to 0.47, 0.15 to 0.35, and 0.19 to 0.27. Gas turbine engines 100 with disk-to-nacelle diametric ratios in these ranges can desirably feature enhanced performance compared to conventional gas turbine engines 100 due to reduced drag and reduced fan distortion. Further benefits have been identified when a gas turbine engine is configured to have a DND ratio in the ranges disclosed above, in combination with an ITN ratio in the ranges disclosed above. For example, a gas turbine engine can have a DND ratio of 0.21 and an ITN ratio of 0.27, both of which meet at least one of the stated desirable ranges for the DND and ITN ratios. It should be noted that a gas turbine engine can be configured to meet any combination of the disclosed DND ratios and the disclosed ITN ratios.

In another set of examples, enhanced performance can unexpectedly be achieved with disk-to-inlet length (DIL) ratios within the range 0.30 to 0.80. A disk-to-inlet ratio is the ratio of the disk spacing length 440 to the inlet length 330. The inventors of the present disclosure have found that enhanced performance of gas turbine engines 100 can be achieved with disk-to-inlet ratios that range from 0.4 to 0.8, 0.4 to 0.7, and 0.45 to 0.67. Gas turbine engines 100 with disk-to-inlet ratios in these ranges can desirably feature enhanced performance compared to conventional gas turbine engines 100 due to reduced drag and reduced fan distortion. Further benefits have been identified when a gas turbine engine is configured to have a DIL ratio in the ranges disclosed above, in combination with an ITN ratio in the ranges disclosed above. For example, a gas turbine engine can have a DIL ratio of 0.49 and an ITN ratio of 0.27, both of which meet at least one of the stated desirable ranges for the DIL and ITN ratios. It should be noted that a gas turbine engine can be configured to meet any combination of the disclosed DIL ratios and the disclosed ITN ratios.

Table 2 below illustrates exemplary engines with the disk-to-blade diametric (DBD) ratios, disk-to-nacelle diametric (DND) ratios, and disk-to-inlet (DIL) ratios in the ranges disclosed herein. For each exemplary gas turbine engine disclosed in Table 2, the gas turbine engine has an ITN ratio that is 0.23 to 0.35.

with fan blades having fan diameters in the FBD #3 range. In each of the exemplary engines, the ASR is in the range of 1.5 to 16.0. ASR ranges can also be beneficially between 4.0 and 14.0, 6.6 and 13.5, or the other ranges disclosed herein.

In some embodiments, it was additionally found that the acoustic performance can be further improved without negatively affecting other aspects of performance by using composite fan blades to enable a higher bypass ratio. A higher bypass ratio can reduce noise generation, thereby improving acoustic performance, by reducing the fan pressure ratio of the fan (e.g., from 1.5 to 1.4, or 1.35), and operating within the defined ranges for BEAL and ASR, as discussed above. Some embodiments include turbomachines with bypass ratios of 10:1 to 17:1, or, in other examples from 12:1 to 15:1, where bypass ratio is defined as the ratio of air passing through the fan case that bypasses the inlet to the engine core, to the air that enters the engine core, at a takeoff condition. For the higher bypass ratios in this range, it was found that composite blades, operating in the defined BEAL and ASR ranges, provide improved acoustic performance while also providing improved blade toughness when encountering flutter or foreign object impact that can result in blade loss.

In some embodiments, the fan blades comprise composite materials. For example, the fan blade can comprise fiber-reinforced composite materials that include a matrix and one or more plies with fibers. The fiber-reinforced composite material can be formed from a continuous wrap ply or from multiple individual plies. In some examples, the fiber-reinforced composite material can be formed with a plurality of fiber plies (or bands) interwoven in an in-plane and out-of-plane orientation by interleaving each of the plurality of fiber bands with one or more of the plurality of fiber bands previously laid down and not in a common plane to fill the one or more gaps and define a uniformly covered multi-layered assembly. The plurality of fiber bands can also be interwoven in three or more different orientation angles, as described in U.S. Pat. No. 9,249,530, which is incorporated by reference in its entirety herein. In some examples, the fibers can be woven in three dimensions as described in U.S. Pat. No. 7,101,154, which is incorporated by reference in its entirety herein.

TABLE 2

| Engine | fan-disk spacing length (in) 440 | fan diameter (in) 220 | nacelle diameter (in) 430 | inlet length (in) 330 | DBD Ratio | DND Ratio | DIL Ratio | ITFD |
|---|---|---|---|---|---|---|---|---|
| 1 | 24 | 46 | 64 | 36 | 0.52 | 0.38 | 0.67 | 0.78 |
| 2 | 26 | 53 | 75 | 37 | 0.49 | 0.35 | 0.70 | 0.70 |
| 3 | 35 | 61 | 87 | 48 | 0.57 | 0.40 | 0.73 | 0.79 |
| 4 | 24 | 69 | 96 | 37 | 0.35 | 0.25 | 0.65 | 0.54 |
| 5 | 21 | 78 | 102 | 37 | 0.27 | 0.21 | 0.57 | 0.47 |
| 6 | 22 | 78 | 104 | 39 | 0.28 | 0.21 | 0.56 | 0.50 |
| 7 | 48 | 93 | 115 | 63 | 0.52 | 0.42 | 0.76 | 0.68 |
| 8 | 17 | 88 | 116 | 35 | 0.19 | 0.15 | 0.49 | 0.40 |
| 9 | 21 | 80 | 107 | 32 | 0.26 | 0.20 | 0.66 | 0.40 |
| 10 | 10 | 115 | 135 | 33 | 0.09 | 0.07 | 0.30 | 0.29 |
| 11 | 36 | 61 | 77 | 45 | 0.59 | 0.47 | 0.80 | 0.74 |

FIG. 4 discloses acoustic spacing ratios for exemplary gas turbine engines as described herein. Engines #1, 2, 4, 5, and 19 illustrate exemplary engines with fan blades having fan diameters in the FBD #1 range, Engines #3, 6, 7, 8, 13, 14, 15, 17, 18, 20, 21, and 22 illustrate exemplary engines with fan blades having fan diameters in the FBD #2 range, and Engines #9, 10, 11, 12, and 16 illustrate exemplary engines The fiber types may be mixed within a given layer, ply or different plies may be formed using different fiber types. In one example, harder, shear resistant fibers may be incorporated at an impact surface, while the fiber near a back surface may be selected for enhanced energy absorption. Non-limiting examples of harder shear resistant fibers include metallic or ceramic fibers. Non-limiting examples of fibers with relatively high energy absorption include S-glass, aramid fibers (e.g., Kevlar® and Twaron®), as well as oriented polyethylene fibers, such as Spectra® and Dyneem®. Kevlar® is sold by E. I. du Pont de Nemours and Company, Richmond Va. Twaron® aramid fibers are sold by Tejin Twaron, the Netherlands. Spectra® fiber is sold by Honeywell Specialty Materials, Morris N.J. Dyneema® fiber is sold by Dutch State Mines (DSM), the Netherlands.

Referring again to FIG. 3, in some embodiments, an angle 333 formed by the leading edge 321 of a respective one of the OGVs 190 and the engine centerline (i.e., longitudinal axis 101) is between 35 and 120 degrees. For clarity, angle 333 is defined by the line that passes through the leading edge 321 at the 25% & 75% span of the OGV, as measured from the leading-edge root to tip of the OGV 190. In some embodiments, the angle 333 can be in the range 40-75 degrees, or in the range of 45-70 degrees.

In other embodiments, angle 333 can be greater than 90 degrees and less than 120 degrees. In such an embodiment, the OGV 190 comprises a forward swept OGV 190. Referring to FIG. 3, a forward swept OGV 190 results in an OGV 190 that is closer to the fan blades 113. This can advantageously to shorten the engine length, and decrease the acoustic spacing 320, which can further improve the acoustic performance of the engine.

At angle greater than 90 degrees, it may be desirable to further include additional acoustic treatments on the OGVs since the acoustic spacing 320 is reduced. For example, perforated panels and/or sculpted leading and/or trailing edges can be utilized.

By adjusting the angle 333 within the specified range, the OGVs can be positioned to direct airflow more effectively through the engine. This optimized direction helps in reducing turbulence and improving the aerodynamic efficiency of the engine, which can further reduce noise generation.

In view of the above-described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

A gas turbine engine comprising: a core turbine engine comprising a low pressure turbine; a gearbox assembly coupled to the low pressure turbine; a fan coupled to the gearbox assembly and having a fan diameter and a plurality of fan blades with a blade solidity that is greater than or equal to 0.8 and less than or equal to 2.0; a blade effective acoustic length (BEAL) defined as:

$$BEAL = \frac{2c^2}{S(1-rr)N_b}\cos(\gamma)$$

wherein c is the chord length of a fan blade of the plurality of fan blades, S is a span of the fan blade, rr is a radius ratio of the fan, $\gamma$ is the stagger angle of the fan blade, and $N_b$ is the number of the plurality of fan blades; a nacelle that includes a fan case that surrounds the fan, the fan case comprising an inlet disposed forward of the fan and an inlet length, wherein the inlet length is an axial distance between the leading edge of one of the plurality of fan blades and the inlet to the fan, as measured at a 75% span position of the fan blade; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes, and an inlet-to-nacelle (ITN) ratio is defined as a ratio of the inlet length to a maximum diameter of the nacelle, wherein the ASR of the gas turbine engine is 1.5 to 16.0 and the ITN ratio is 0.18 to 0.45, or alternatively, 0.23 to 0.35.

The gas turbine engine of the preceding clause, also including a disk-to-blade diametric (DBD) ratio defined as a ratio of a disk spacing length to the fan diameter, the disk spacing length being a distance between a forwardmost end of a fan disk and an intersection with the inlet taken along an engine centerline, wherein the DBD ratio of the gas turbine engine is 0.09 to 0.59, 0.15 to 0.35, or 0.19 to 0.27.

The gas turbine engine of any preceding clause, also including a disk-to-nacelle diametric (DND) ratio defined as a ratio of a disk spacing length to the fan diameter, the disk spacing length being a distance between a forwardmost end of a fan disk and an intersection with the inlet taken along an engine centerline, wherein the DND ratio of the gas turbine engine is 0.07 to 0.47, 0.15 to 0.35, or 0.15 to 0.25.

The gas turbine engine of any preceding clause, also including a disk-to-inlet length (DIL) ratio defined as a ratio of a disk spacing length to the fan diameter, the disk spacing length being a distance between a forwardmost end of a fan disk and an intersection with the inlet taken along an engine centerline, wherein the DIL ratio of the gas turbine engine is 0.30 to 0.80, 0.3 to 0.70, or 0.49 to 0.65.

The gas turbine engine of any preceding clause, further comprising a fan pressure ratio from 1.25 to 1.45.

The gas turbine engine of any preceding clause, further comprising an inlet length ratio that is a ratio of an inlet length to a diameter of the fan blade, wherein the inlet length defines an average distance from a leading edge of the fan blade to an inlet of the fan, and wherein the inlet length ratio is 0.15 to 0.4, or 0.15 to 0.3.

The gas turbine engine of any preceding clause, wherein the fan case further comprises an acoustic treatment disposed on an interior surface of the fan case, and, optionally, the acoustic treatment length is 50% to 90% of an inlet length.

The gas turbine engine of any preceding clause, wherein the number of the plurality of outlet guide vanes is at least twice the number of the plurality of fan blades.

The gas turbine engine of any preceding clause, wherein the low pressure turbine comprises at least three low pressure turbine stages or at least four low pressure turbine stages.

The gas turbine engine of any preceding clause, wherein plurality of outlet guide vanes further comprise serrated leading edges.

The gas turbine engine of any preceding clause, wherein the plurality of fan blades comprise composite materials that include a matrix and a plurality of fiber plies.

The gas turbine engine of any preceding clause, wherein the plurality of fiber plies are interwoven in in-plane and out-of-plane orientations, and/or the plurality of fiber plies are interwoven in three or more different orientation angles.

The gas turbine engine of any preceding clause, wherein a fan blade diameter of the fan blade is 65-80 inches, 80-95 inches, or 95-115 inches.

The gas turbine engine of any preceding clause, wherein the number of the plurality of fan blades is 14-26, 20-24, or 20-22.

The gas turbine engine of any preceding clause, wherein the blade solidity is 0.8 to 1.5, 1.0 to 2.0, or 1.25 to 1.75.

The gas turbine engine of any preceding clause, wherein the gas turbine engine has a bypass ratio of 10:1 to 17:1 or 12:1 to 15:1.

The gas turbine engine of any preceding clause, further comprising a plurality of outer guide vanes (OGV), wherein a leading edge of a respective one of the plurality of OGVs defines an angle with respect to an engine centerline, wherein the angle is between 35 and 120 degrees.

In view of the many possible examples to which the principles of the disclosure may be applied, it should be recognized that the illustrated examples are only preferred examples and should not be taken as limiting the scope. Rather, the scope is defined by the following claims. We therefore claim all that comes within the scope and spirit of these claims.

We claim:

1. A gas turbine engine comprising:

a core engine comprising a low pressure turbine;

a gearbox assembly coupled to the low pressure turbine;

a fan coupled to the gearbox assembly and having a fan diameter and a plurality of fan blades with a blade solidity that is greater than or equal to 0.8 and less than or equal to 2.0;

a blade effective acoustic length (BEAL) defined as:

$$BEAL = \frac{2c^2}{S(1-rr)N_b}\cos(\gamma)$$

wherein c is a chord length of a fan blade of the plurality of fan blades, S is a span of the fan blade, rr is a radius ratio of the fan, $\gamma$ is a stagger angle of the fan blade, and $N_b$ is the number of the plurality of fan blades;

a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at a 75% span position of the fan blade;

a plurality of outlet guide vanes disposed aft of the fan and extending radially between the core engine and the fan case;

an acoustic spacing from the fan blade trailing edge to an outlet guide vane leading edge;

an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes;

an inlet-to-nacelle (ITN) ratio defined as a ratio of the inlet length to a maximum diameter of the nacelle; and a plurality of outer guide vanes (OGV), wherein a leading edge of a respective one of the plurality of OGVs defines an angle with respect to an engine centerline, the angle being between 35 and 120 degrees, wherein the ASR of the gas turbine engine is 1.5 to 16.0, and the ITN ratio is 0.18 to 0.45.

2. The gas turbine engine of claim 1, wherein the ITN ratio is 0.30 to 0.45.

3. The gas turbine engine of claim 2, wherein the gas turbine engine further comprises a plurality of part-span inlet guide vanes.

4. The gas turbine engine of claim 1, wherein the ITN ratio is 0.18 to 0.30.

5. The gas turbine engine of claim 4, wherein the gas turbine engine further comprises one or more thermal systems components housed within the nacelle.

6. The gas turbine engine of claim 1, further comprising an inlet-to-fan diameter (ITFD) ratio, wherein the ITFD of the gas turbine engine is a ratio of the inlet length to the fan diameter, and the ITFD is 0.29 to 0.79.

7. The gas turbine engine of claim 1, further comprising an inlet-to-fan diameter (ITFD), wherein the ITFD ratio is 0.40 to 0.70.

8. The gas turbine engine of claim 1, further comprising a plurality of outer guide vanes (OGV), wherein a leading edge of a respective one of the plurality of OGVs defines an angle with respect to an engine centerline, wherein the angle is between 35 and 120 degrees.

9. The gas turbine engine of claim 1, wherein the plurality of OGVs are forward swept OGVs and the angle is greater than 90 degrees and less than 120 degrees.

10. The gas turbine engine of claim 9, further comprising a disk-to-nacelle diametric (DND) ratio defined as a ratio of a disk spacing length to the fan diameter, the disk spacing length being a distance between a forwardmost end of a fan disk and an intersection with the inlet taken along an engine centerline, wherein the DND ratio of the gas turbine engine is 0.07 to 0.47.

11. The gas turbine engine of claim 10, wherein the DND ratio of the gas turbine engine is 0.15 to 0.35.

12. The gas turbine engine of claim 1, further comprising a fan pressure ratio from 1.25 to 1.45.

13. The gas turbine engine of claim 1, wherein the ASR is 4.0 to 14.0.

14. The gas turbine engine of claim 1, wherein the ASR is 6.6 to 13.5.

15. The gas turbine engine of claim 1, wherein the number of the plurality of outlet guide vanes is at least twice the number of the plurality of fan blades.

16. A gas turbine engine comprising:

a core turbine engine comprising a low pressure turbine;

a gearbox assembly coupled to the low pressure turbine;

a fan coupled to the gearbox assembly and having a fan diameter and a plurality of fan blades with a blade solidity that is greater than or equal to 0.8 and less than or equal to 2.0;

a blade effective acoustic length (BEAL) defined as:

$$BEAL = \frac{2c^2}{S(1-rr)N_b}\cos(\gamma)$$

wherein c is a chord length of a fan blade of the plurality of fan blades, S is a span of the fan blade, rr is a radius ratio of the fan, $\gamma$ is a stagger angle of the fan blade, and $N_b$ is the number of the plurality of fan blades;

a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at a 75% span position of the fan blade;

a plurality of outlet guide vanes disposed aft of the fan and extending radially between the core turbine engine and the fan case;

an acoustic spacing from the fan blade trailing edge to an outlet guide vane leading edge;

an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes; and an inlet-to-fan diameter (ITFD) ratio, wherein the ITFD ratio is a ratio of the inlet length to the fan diameter, and the ITFD is 0.29 to 0.79, wherein the ASR of the gas turbine engine is 1.5 to 16.0, and the ITFD ratio is 0.29 to 0.79.

17. The gas turbine engine of claim 16, further comprising an inlet-to-nacelle (ITN) ratio defined as a ratio of the inlet length to a maximum diameter of the nacelle, wherein the ITN ratio is 0.30 to 0.45, and the gas turbine engine further comprises a plurality of part-span inlet guide vanes.

18. The gas turbine engine of claim 16, wherein the ITN ratio is 0.18 to 0.30, and the gas turbine engine further comprises a one or more thermal systems components housed within the nacelle.

19. The gas turbine engine of claim 16, further comprising a plurality of outer guide vanes (OGV), wherein a leading edge of a respective one of the plurality of OGVs defines an angle with respect to an engine centerline, wherein the angle is between 35 and 120 degrees.

20. The gas turbine engine of claim 19, wherein the plurality of OGVs are forward swept OGVs and the angle is greater than 90 degrees and less than 120 degrees.

* * * * *